Feb. 3, 1959                A. A. THENE                2,872,080
                MATERIAL SPREADING ATTACHMENT FOR TRUCK
Filed June 18, 1957                                    3 Sheets-Sheet 1
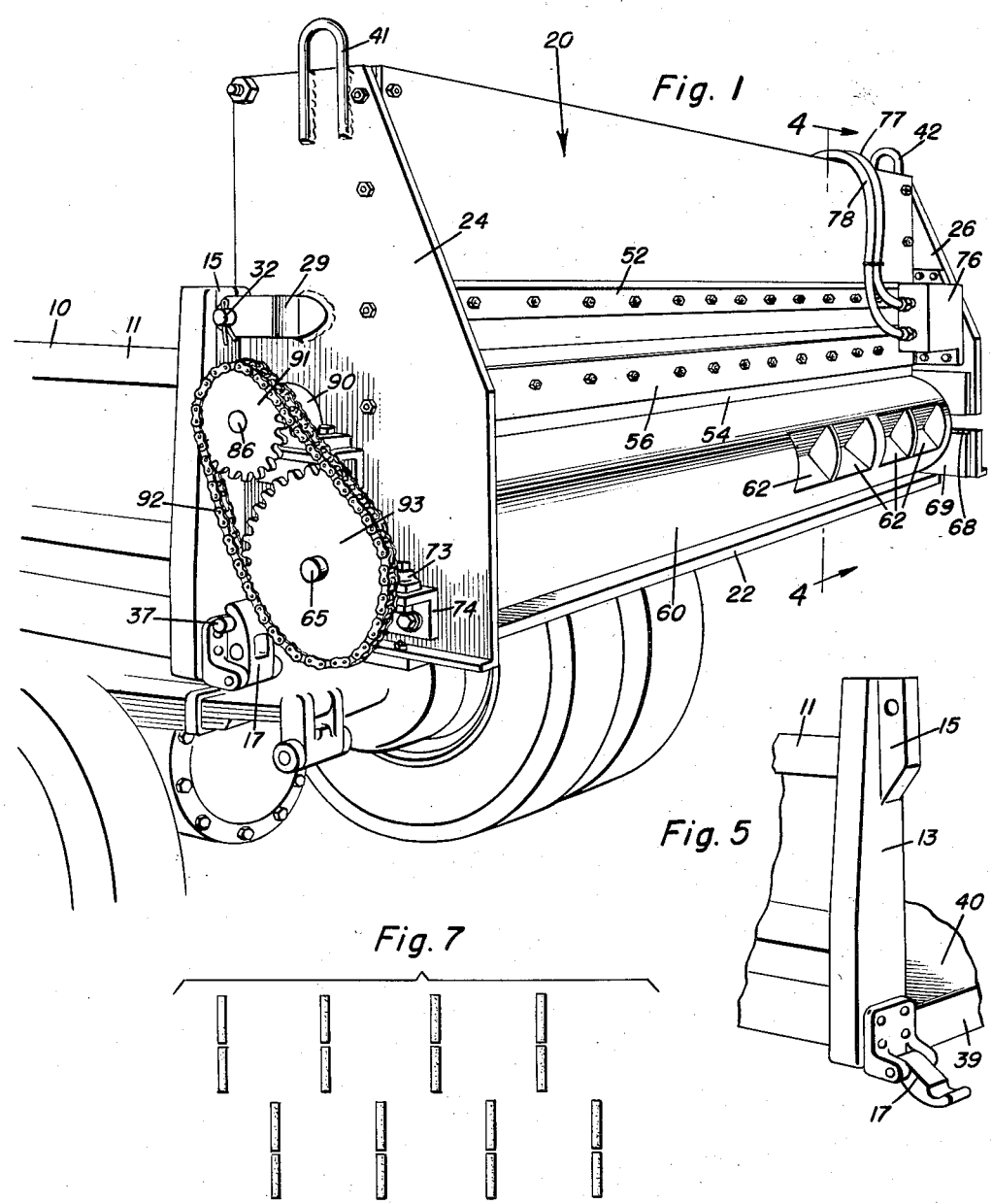
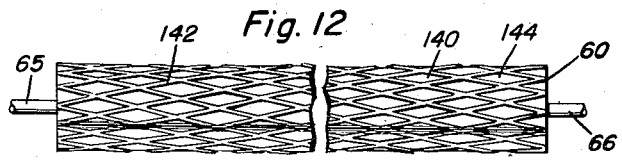
Anthony A. Thene
INVENTOR.

Feb. 3, 1959          A. A. THENE          2,872,080
MATERIAL SPREADING ATTACHMENT FOR TRUCK
Filed June 18, 1957          3 Sheets-Sheet 2
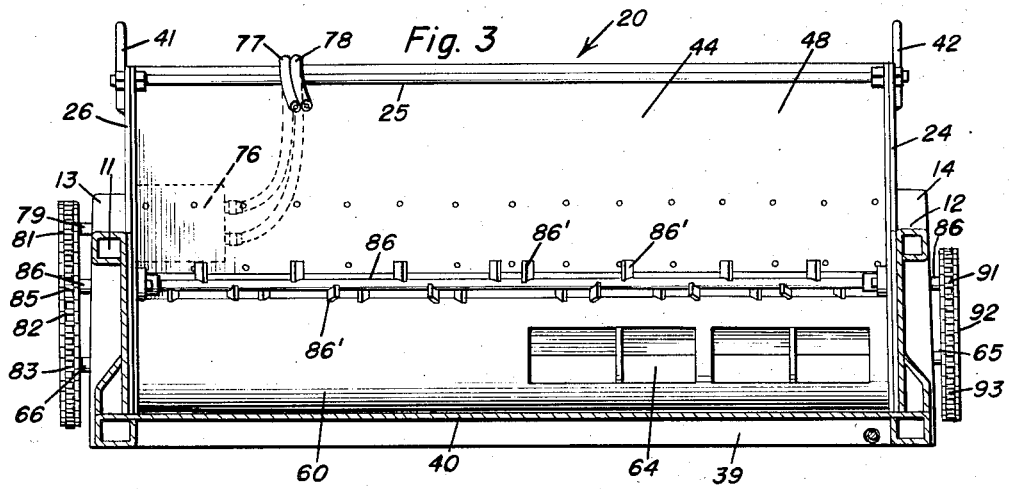
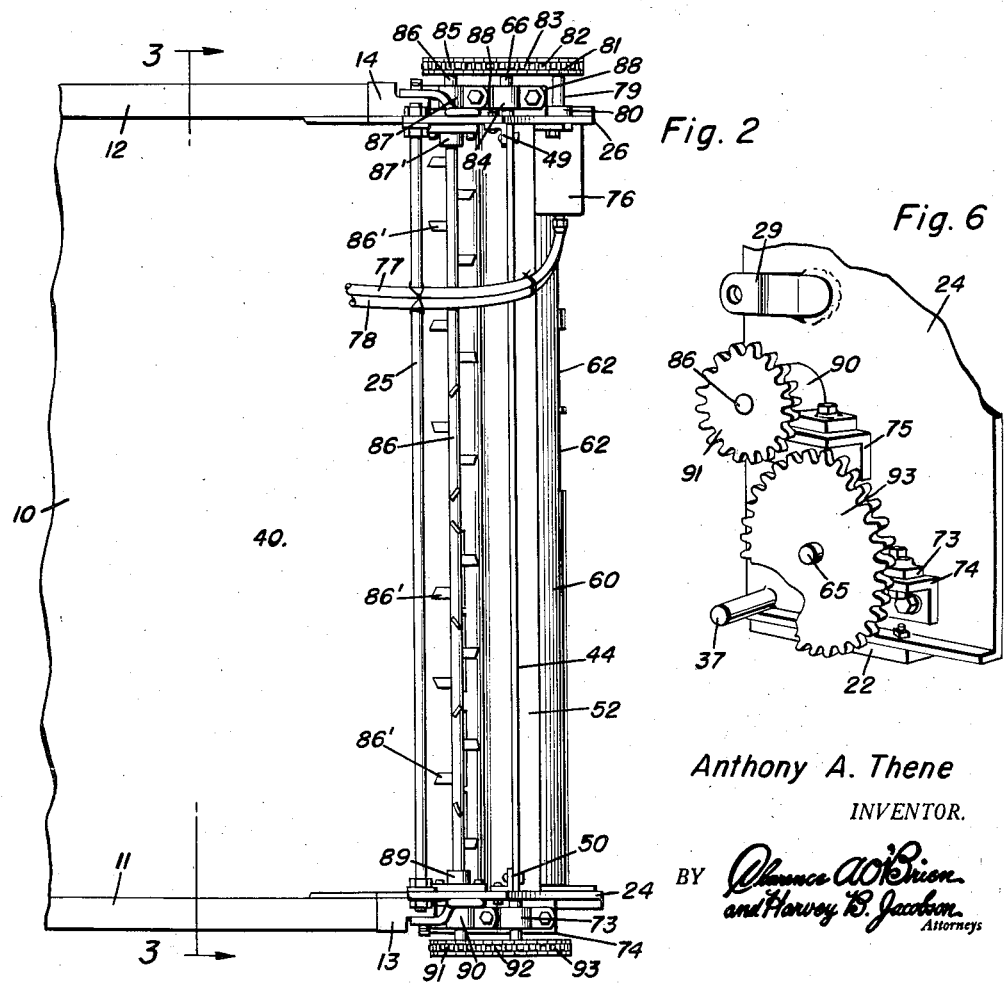
Anthony A. Thene
INVENTOR.

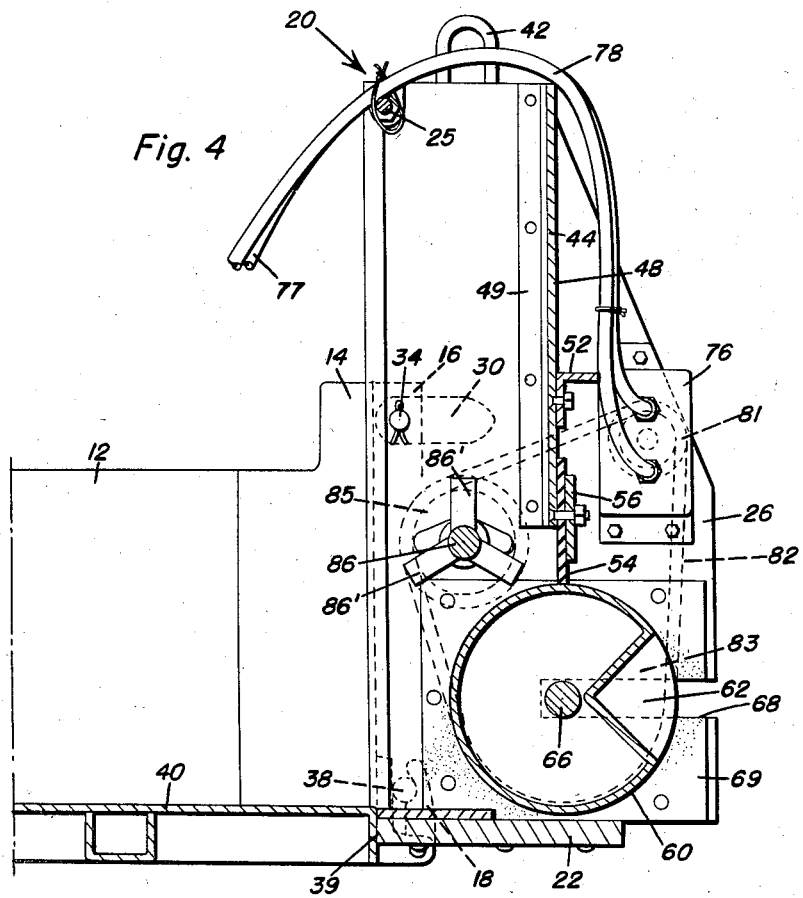
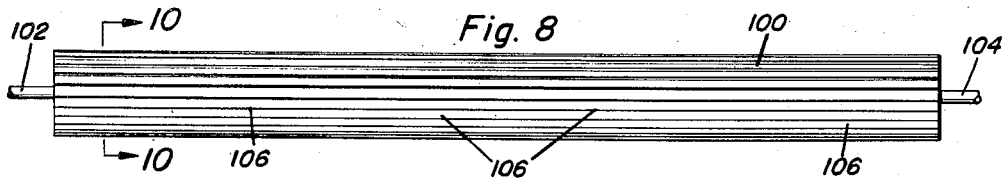
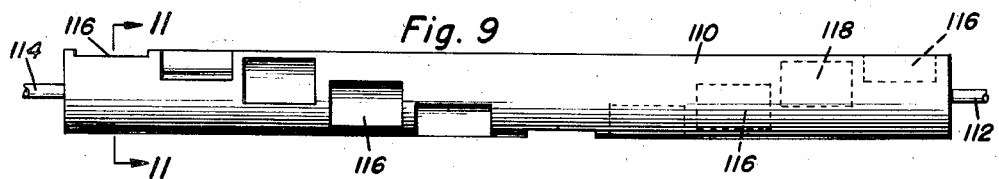
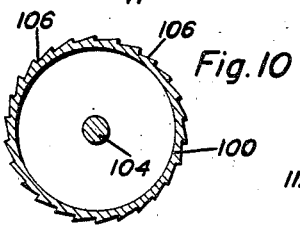
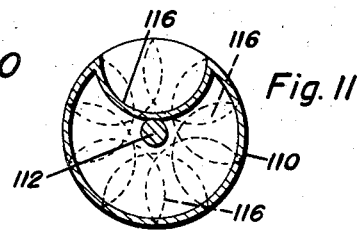

United States Patent Office 2,872,080
Patented Feb. 3, 1959

2,872,080

MATERIAL SPREADING ATTACHMENT FOR TRUCK

Anthony A. Thene, St. Cloud, Minn.

Application June 18, 1957, Serial No. 666,430

3 Claims. (Cl. 222—178)

This is a continuation-in-part of my copending application Serial No. 630,699. The invention described herein relates to the art of distributing materials on highways for the purpose of increasing traction during icy, or snowy weather.

An object of the invention is to provide an attachment for an ordinary truck body, the attachment replacing the tailgate of the truck body and providing for the sequential distribution of charges of fluent material, as sand, cinders, calcium chloride, salt, etc.

A more specific object of the invention is to provide an attachment for the back part of a dump truck body or other suitable types of truck bodies, the attachment fitting neatly and conveniently at the rear end thereof and taking the place of the tailgate or other rear closure of the truck body, the attachment having a rotating drum which sequentially deposits charges of material as the forward progress of the truck continues. There is an agitator superposed with respect to the rotating material distributing drum to assure that the pockets in the drum will be filled to the same depth at all times during the material distributing function.

As the truck moves forward, my attachment is powered at a speed proportional to the forward progress of the truck. By a proper selection of rotating drums, various patterns of material are laid on the road surface. The thickness of each charge of fluent material is a function of the speed of the drum and the forward motion of the truck, both of which are capable of being controlled. It has been found that sand or other fluent, abrasive material, when applied in thick charges is more effective than a thin layer of sand spread generally or broadcast over the entire roadway area. My attachment provides means for so distributing charges of fluent material.

A further object of the invention is to provide a practical device of the character to be described, the device functioning very satisfactorily when applied to the rear of a truck body. Other objects and features of importance will become apparent in following the description of the illustrated forms of the invention.

Figure 1 is a fragmentary perspective view of a truck body and undercarriage together with an attachment constructed in accordance with the invention and mounted on the rear end of the truck body, taking the place of the tailgate thereof;

Figure 2 is a top view of the attachment and truck body of Figure 1;

Figure 3 is a sectional view taken on the line 3—3 of Figure 2 and showing the attachment in elevation;

Figure 4 is a transverse sectional view taken on the line 4—4 of Figure 1;

Figure 5 is a fragmentary perspective view showing a corner of the truck body into which the attachment is fitted;

Figure 6 is a fragmentary perspective view showing two sprockets which constitute part of the invention, one sprocket being for the material distributing drum and the other being for the agitator that is located adjacent to the material distributing drum;

Figure 7 is a schematic representation of a typical pattern of fluent material distributed from my attachment;

Figure 8 is an elevational view of a modified material distributing drum;

Figure 9 is an elevational view of a further modification of the material distributing drum, the difference between drums of Figures 1, 8 and 9 being in the arrangement, shape and size of pockets;

Figure 10 is a sectional view on an enlarged scale taken on the line 10—10 of Figure 8;

Figure 11 is a transverse sectional view taken on the line 11—11 of Figure 9; and Figure 12 is an elevational view of another modification of the material distributing drum, made so by the application of a cylinder that has an expanded metal covering thereon.

In the accompanying drawings there is a truck body 10 having sides 11 and 12 at whose rear ends there are corner posts 13 and 14 respectively. Mounting ears 15 and 16 are carried by the posts 13 and 14, and they ordinarily support the upper edge of the truck tailgate. The lower edges of the truck tailgate are releasably held by latches 17 and 18. The latches are arranged to release the lower edge of the tailgate so that it is capable of swinging to an open position when it is desired to unload the truck.

My attachment 20 is separably attached to the truck body 10 in substantially the same manner as the tail gate which it replaces. Therefore, the attachment may be separated from the truck body in a matter of a few minutes and replaced by the tailgate. Attachment 20 has a bottom 22 together with sides 24 and 26 which are attached to the bottom, as by being bolted through mounting flanges provided on the lower edges of the sides 24 and 26. Two mounting ears 29 and 30 are fixed, as by being welded, to the sides 24 and 26 and have holes through which pins 32 and 34 are adapted to pass. Cotter keys or like fasteners are passed through passages in the pins 32 and 34 after they are passed through the aligned holes in the mounting ears 15 and 16, and the mounting ears 29 and 30. This holds the upper rear edge of the attachment 20 fastened to the posts 13 and 14 just as the tailgate for the truck body was formerly held. Pins 37 and 38 protrude laterally from the lower front corners of the sides 24 and 26 and are releasably embraced and held by clamps 17 and 18. These clamps function in the same manner when engaging pins 37 and 38 as when engaging the pins of the tailgate. The front edge 39 of bottom 22 bears against the rear edge of bottom 40 of the truck body 10 and this further aids in holding the attachment steady and securely fastened in place. Hangers 41 and 42 at the upper edges of the sides 24 and 26 facilitate the lifting of the attachment 20 by power equipment.

There is a back wall 44 extending across and secured to sides 24 and 26. The back wall consists of a panel 48 which is bolted or otherwise attached to a pair of angle iron battens 49 and 50, the latter being fixed to the inner surfaces of sides 24 and 26. A transverse supporting angle 52 is secured to panel 48, and a resilient wiper 54 is connected to the lower edge of panel 48. A metal strip 56 is mounted on the wiper 54 and bolted to the panel 48 thereby holding the wiper firmly in place and as a lower extension of panel 48.

A material distributing drum 60 is mounted for rotation beneath wiper 54 and has its generally cylindrical surface scraped by the resilient wiper as the drum 60 is rotated. Staggered groups 62 and 64 of pockets are formed in the surface of drum 60 and they accept material from the truck body and delivered it onto the street below. The pockets in groups 62 and 64, which are spaced 180° from each other and on opposite ends of the drum, are substantially V-shaped in cross-section. Drum 60 is preferably hollow to achieve an economy in weight and construction costs. Therefore the ends have panels to which shafts 65 and 66 are fixed. These shafts are aligned with each other, with shaft 66 passing into slot 68 that is formed in side 26 and strengthening plate 69 thereon. Shaft 65 is passed through a hole in side 24 and is mounted on a bearing 73 carried by support 74 which is bolted or otherwise secured to the outer surface of side 24. The pattern of fluent material deposits of Figure 7 is made by using drum 60.

A hydraulic motor 76 is bolted or otherwise fixed to the side 26 and brace 52. Hydraulic lines 77 and 78 are operatively connected with hydraulic motor 76 and the hydraulic power equipment of the truck. As a safety precaution, one of the lines has a hydraulic bypass and safety valve to prevent damage to the attachment should a rock or other large object become clogged in one of the pockets of drum 60. The output shaft 79 of motor 76 is passed through a bearing 80 on side 26 of the attachment body, and there is a sprocket 81 attached to shaft 79. A chain 82 is entrained around sprocket 81 and around sprocket 83 which is fixed onto shaft 66 on the outside of bearing 84. Bearing 84 is carried by support 88 on side 26 and has shaft 66 rotatably mounted in it. Chain 82 is also entrained around sprocket 84, the latter being fixed to an end of shaft 85 which is passed through bearings 87' and 87, the latter carried on support 88' onto the outside surface of side 26 of the body. Shaft 86 extends transversely across the attachment body parallel to the stay bolt 25 which braces sides 24 and 26 and has a plurality of blades 86' thereon thereby constituting a fluent material agitator. The agitator is parallel to the axis of rotation of drum 60 and is located in close superposition to the drum. The opposite end of shaft 86 is passed through bearings 89 and 90 that are attached respectively to side 24 of the body and to the support 75. Sprocket 91 is fixed to this end of shaft 86 and has chain 92 engaged with it. This chain is also entrained over sprocket 93 which is fixed on the outer end of drum shaft 65 and which is mounted for rotation in bearing 73 carried by support 74 on the outer surface of side 24. By following the chain and sprocket drives described above it will be seen that the agitator is rotated in unison with the rotation of drum 60 and both the agitator and drum are actuated by the hydraulic motor 76.

Attention is now invited to Figures 8 and 10 where a modification of the drum is illustrated. Here, drum 100 is shown as being generally cylindrical and hollow. It has coaxial shafts 102 and 104 that protrude from end panels of the hollow drum. The pockets 106 in the drum side wall are formed as longitudinal corrugations. Pockets 106 are so arranged that they will distribute the material in a pattern quite different from Figure 7. Drum 100 will replace drum 60 in my attachment.

Attention is now directed to Figures 9 and 11 where a further modification of the drum is shown. Here, drum 110 is of generally cylindrical and hollow formation and has coaxial shafts 112 and 114 at its ends. A spirally arranged group 116 of pockets 118 are arranged in the drum 110, these pockets opening through the surface thereof just as all the other pockets in drums 100 and 60. As shown in Figure 11 the pockets may have a curved bottom wall instead of the V-shaped bottom wall of the pockets in drum 60 or drum 100.

In Figure 12 I have illustrated a further modification of the material distributing drum. It is constructed of any one of the previously described drums that is fitted with a cylindrical covering 140. This cylinder seals the various pockets of the drum that is selected, for example, drum 60. But, the outer surface of the cylinder 140 is covered with a lattice 142 which is formed in any manner, for example by welding or otherwise adhering expanded metal thereon. The lattice constructed in this way forms a multiplicity of discreet pockets 144 which serve a distributing function.

Moreover, cylinder 140 covered with a lattice 142 of expanded metal may replace drum 60, if continuous sanding is desired and can be used for seal coating without changing the cylinder. Cylinder 140 may also be used in a less expensive seal coating spreader in a different design.

In operation, the body 10 of the truck is loaded and the truck moved over the highway at the desired rate of speed with respect to the speed of rotation of the drum. The agitator assures that the pockets of the drum will be filled with material from the body of the truck and upon rotation of the drum, discreet discharges of fluent material are expelled onto the highway.

The foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention as claimed.

What is claimed as new is as follows:

1. In combination with a truck body having a bed, side walls projecting upwardly from said bed and defining a material confining space therewith, said bed and side walls having coplanar rear edges provided with means for normally attaching a tail gate thereto; a material spreading attachment for said truck body including a pair of side plates positioned so as to effect rearward extensions of said side walls and being detachably secured thereto by said means which normally secures the tail gate to the truck body, a bottom wall rigid with and extending between said side plates to form a rearward extension of said bed whereby said side plates and bottom wall provide a rearward extension of said material confining space in the body, a material spreading drum extending between said side plates having opposite end portions disposed in close adjacency to the inner faces of said side plates and being rotatably mounted therebetween, said drum having a plurality of longitudinally spaced pockets therein for entrapping and spreading discrete quantities of material from the rear of the attachment as the drum rotates, and means for rotating said drum.

2. In combination with a truck body having a bed, side walls projecting upwardly from said bed and defining a material confining space therewith, said bed and side walls having coplanar rear edges provided with means for normally attaching a tail gate thereto; a material spreading attachment for said truck body including a pair of side plates positioned so as to effect rearward extensions of said side walls and detachably secured thereto by said means which normally secures the tail gate to the truck body, a bottom wall rigid with and extending between said side plates to form a rearward extension of said bed whereby said side plates and bottom wall provide a rearward extension of said material confining space in the body, a material spreading drum extending between said side plates having opposite end portions disposed in close adjacency to the inner faces of said side plates, shaft portions rigid with said opposite end portions of said drum and projecting centrally thereof through said side plates, an agitator extending between said side plates forwardly and above said drum and having shaft portions extending from the opposite ends thereof through said side plates, a vertical wall extending between said side plates diametrically above said drum rearwardly of said agitator and having its lower edge terminating immediately above said drum, a resilient wiper depending from said lower edge of the vertical wall and contacting said drum thereacross, a motor mounted on the inner face of one side plate rearwardly of said vertical wall and including a drive shaft projecting through said one side wall, drive means interconnecting the shaft portions of said drum and agitator on the outer sides of said side plates and including, on said one side wall side of the attachment, an operative drive connection with said drive shaft of the motor, said drum having a plurality of longitudinally spaced pockets therein, and the lowermost portion of said drum being spaced in close adjacency to the upper surface of said bottom wall.

3. In combination with a truck body having a bed, side walls projecting upwardly from said bed and defining a material confining space therewith, said bed and side walls having coplanar rear edges provided with means for normally attaching a tail gate thereto, a material spreading attachment for said truck body including a pair of side plates positioned so as to effect rearward extensions of said side walls and detachably secured thereto by said means which normally secures the tail gate to the truck body, a bottom wall rigid with and extending between said side plates to form a rearward extension of said bed whereby said side plates and bottom wall provide a rearward extension of said material confining space in the body, a material spreading drum extending between said side plates having opposite end portions disposed in close adjacency to the inner faces of said side plates, shaft portions rigid with said opposite end portions of said drum and projecting centrally therefrom through said side plates, an agitator extending between said side paltes forwardly and above said drum and having shaft portions extending from the opposite ends thereof through said side plates, a vertical wall extending between said side plates diametrically above said drum rearwardly of said agitator and having its lower edge terminating immediately above said drum, a resilient wiper depending from said lower edge of the vertical wall and contacting said drum thereacross, a motor mounted on the inner face of one side plate rearwardly of said vertical wall and including a drive shaft projecting through said one side wall, drive means interconnecting the shaft portions of said drum and agitator on the outer sides of said side plates and including, on said one side wall side of the attachment, an operative drive connection with said drive shaft of the motor, said drum having a plurality of longitudinally spaced pockets therein for entrapping fluent material contained in the truck body in the rearward extension thereof, said drum and said vertical wall forming a crotch therebetween, said agitator being located within said crotch to continuously agitate material within the region of the crotch to insure the proper filling of said pockets and entrapment of fluent material therewithin, the lowermost portion of said drum being spaced in close adjacency to the upper surface of said bottom wall.

References Cited in the file of this patent

UNITED STATES PATENTS

| | | |
|---|---|---|
| 261,627 | Philpot | July 25, 1882 |
| 1,912,172 | Bailey | May 30, 1933 |
| 2,046,603 | Baumgardner | July 7, 1936 |
| 2,278,948 | Rodli | Apr. 7, 1942 |
| 2,569,421 | Larson | Sept. 25, 1951 |
| 2,673,741 | Durand | Mar. 30, 1954 |
| 2,697,609 | Chase et al. | Dec. 21, 1954 |
| 2,799,510 | Schmidt | July 16, 1957 |

FOREIGN PATENTS

| | | |
|---|---|---|
| 706,633 | Great Britain | Mar. 31, 1954 |